Patented Nov. 1, 1932

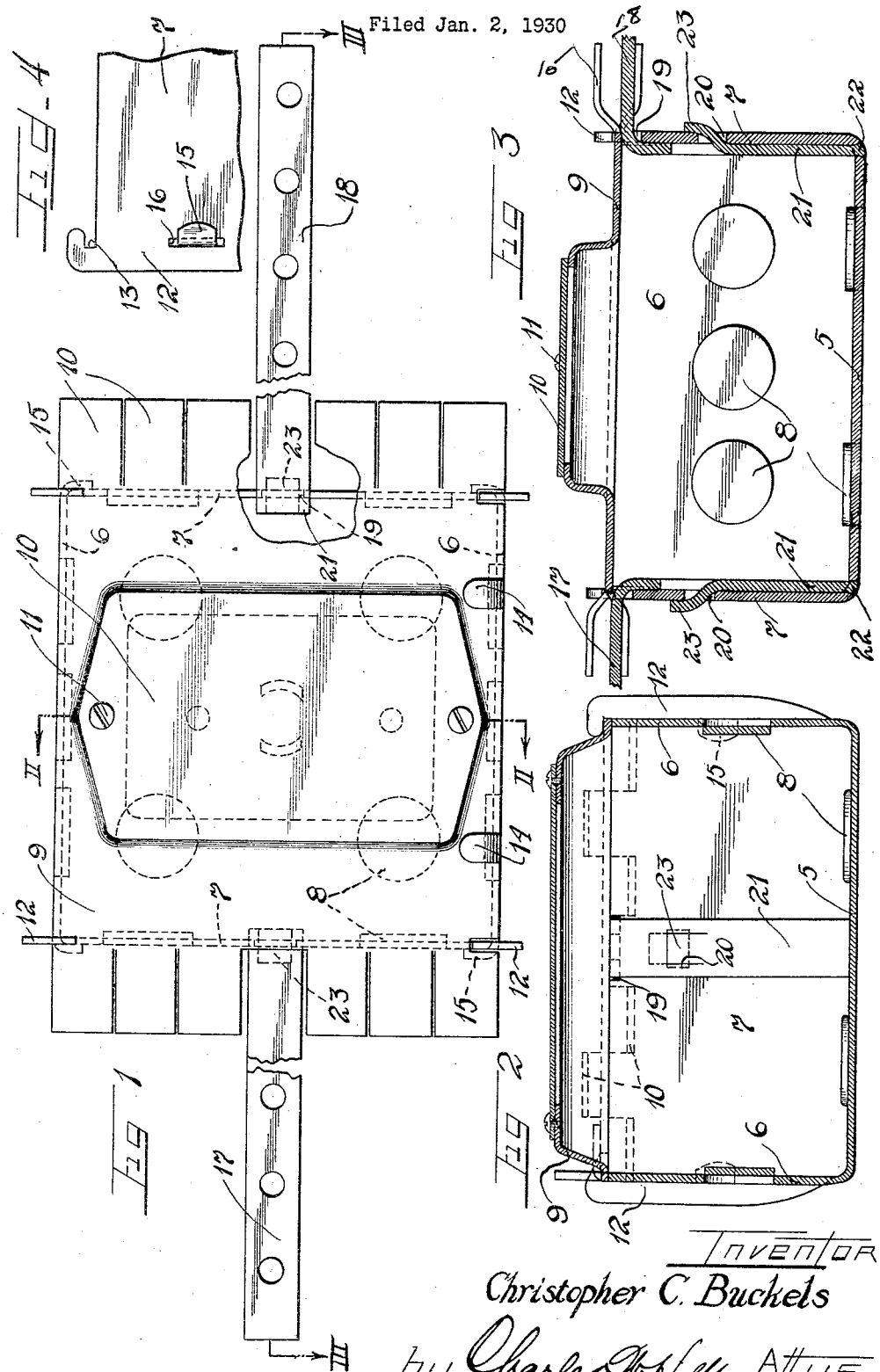

1,886,161

UNITED STATES PATENT OFFICE

CHRISTOPHER C. BUCKELS, OF CHICAGO, ILLINOIS, ASSIGNOR, BY MESNE ASSIGNMENTS, TO CHICAGO MECHANICAL MANUFACTURING CO., OF CHICAGO, ILLINOIS, A CORPORATION OF ILLINOIS

OUTLET BOX AND HANGER AND METHOD OF MAKING THE SAME

Application filed January 2, 1930. Serial No. 417,957.

This invention relates to improvements in outlet boxes, switch boxes, and the like, normally used for containing wiring, switch mechanism, fixture brackets, etc. for electrical installation, the present invention relating more particularly to a combination outlet box and hanging or mounting means for the same embodied as a single unit, and to a novel method of making the same, the invention being particularly desirable for use in new structures prior to the finishing operation on the walls, ceilings, floors, and the like, although the invention may have many and various uses as will be apparent to one skilled in the art.

In the past, repeated and tedious operations have frequently been necessary in the installation of outlet boxes and the like, especially in walls and similar places. Obviously, numerous operations are objectionable due to the expense incurred not only by the usage of a surplus of material, but also by the labor necessitated. Hereinbefore, in most instances, it has been necessary to first place the mounting means for the box in the proper position and subsequently either attach the box to the mounting means or else tighten the box in a fixed location on the mounting means. Also, many times it was essential to cut or otherwise adjust the mounting means to make them fit in the desired location. Furthermore, the outlet boxes were frequently available but not the mounting means, and vice versa, causing irksome and expensive delays, and another fruitful cause of vexation, delays, and added costs of building was the fact that, due to some substantially invisible or apparently insignificant error, the various parts of the electrical fittings would not properly coincide. In addition, outlet boxes as made heretofore, in many cases, were objectionably difficult and expensive to manufacture.

The present invention has been designed to overcome the above noted as well as other defects and objections in the provision of an outlet box having the mounting means originally secured thereto so that the box and mounting means are embodied as substantially an entire and individual unit.

The invention also seeks the provision of an outlet box and hanger unit which, without any adjustment thereto whatsoever, is capable of being mounted in substantially any desired position or location within a wall, ceiling, floor, or the like.

It is another object of this invention to provide an outlet box having hanging means attached thereto, which means do not increase in any degree the space normally occupied by an outlet box.

A further object of this invention is to provide an outlet box which is equipped with a plurality of separate hanging bars of unequal length, the bars being connected to the box so as not to increase the external dimensions of the box.

Still a further object of this invention is the provision of a novel method of making an outlet box.

While some of the more salient features, characteristics, and advantages of a structure and method embodying this invention have been above pointed out, others will become apparent from the following disclosures.

The invention includes these and other features of construction and combinations of parts hereinafter described, and shown in a preferred form in the drawing, as more particularly indicated by the claims.

On the drawing:

Figure 1 is a fragmentary top plan view of an outlet box and hanging means therefor, all embodying principles of the present invention.

Figure 2 is a vertical sectional view taken substantially as indicated by the line II—II of Figure 1.

Figure 3 is a fragmentary vertical sectional view taken substantially as indicated by the line III—III of Figure 1.

Figure 4 is a fragmentary view in elevation of a corner portion of the outlet box, showing how the sides of the box are secured together.

As shown on the drawing:

In the illustrated embodiment of this invention, there is shown an outlet box including a bottom 5, a pair of opposed sides 6, and a pair of opposed sides 7, which, in the present instance, form a four-sided open top box, but, of course, it is to be understood that the box may be of any shape with any number of sides. The bottom and sides are, of course, each provided with a plurality of the customary knock-out discs 8. The box is shown provided with a cover 9. The cover may or may not be provided with lath engaging means 10 as is desired, but as clearly seen in Figure 1 the lath engaging members may be very expeditiously provided in the present invention. A top or finishing plate 10' is shown mounted over the aperture in the cover 9 by any desired means as indicated by the screws 11.

The sides 7 are provided at each end thereof with a lug 12 extending outwardly beyond the sides 6. The upper portion of each of the lugs 12 is notched as indicated at 13 in Figure 4 to overlie the cover 9, one margin of the cover being first slipped beneath the lugs 12 on one side of the box and then dropped into position, the opposite side of the cover being notched to permit the same to pass over the lugs 12 on the other side of the box. When the cover is in proper position, it is clamped therein by knocking over the tongues 14 projecting from one of the sides 6.

The sides 6 at each end edge thereof are provided with a lug or tab 15 which, prior to the forming of the box, extends parallel with its respective side. After the box is made, the tab 15 as seen more clearly in Figure 4, extends through a suitable aperture 16 in each lug 12 and is bent at substantially right angles to its respective side to overlie the outer surface of one of the sides 7 to thereby clamp the sides 7 against the end edges of the sides 6, it being noted that the end edges of the sides 6 are in abutment with the sides 7, the latter being elongated by the provision of lugs 12.

From the foregoing, it will at once be apparent that applicant has provided a novel method for making an outlet box. This method consists of first stamping out a blank which includes the bottom 5, the sides 6 with the tabs 15 thereon, and the sides 7 with the lugs 12 thereon, all necessary notches, apertures, and knock-out discs being provided simultaneously with the stamping of the blank. It is then simply necessary to fold the sides 6 and 7 to a position at substantially right angles to the bottom 5, and with such folding of the sides the tabs 15 will project through the aperture 16 in the lugs 12. It is then a simple expedient to bend the tabs 15 inwardly into close engagement with the sides 7. Thus, it will be seen that the box may be assembled without the customary welding, bolting, or riveting operations.

As mentioned hereinabove, hanging or mounting means for the box are provided preferably with the box to form substantially a single unit. In the present instance, these means find embodiment in a hanger bar or strip 17 extending laterally from one of the sides 7 and a hanger bar or strip 18, preferably longer than the bar 17, extending laterally from the opposite sides 7. Each of the sides 7 is provided with a suitable notch 19 in the upper margin thereof of sufficient depth and width to accommodate its respective bar 17 or 18 (Figure 3), and also with an aperture 20 disposed beneath the notch and of less width than the notch for a purpose that will later appear. Each of the bars 17 and 18 is provided with an inwardly turned portion 21 which extends downwardly or inwardly as the case may be immediately within its respective side 7 to the bottom of the box, which bottom is suitably apertured to receive the end of the portion 21 which is riveted thereto as indicated at 22. The portions 21 are each further provided with an integral tongue 23 struck from the portion 21 adjacent the upper region thereof, whereby this tongue will extend through the aperture 20 in its respective side wall 7 of the box and engage the external face thereof. In this manner, each of the bars 17 and 18 is firmly clamped to its respective side wall of the box.

The bars 17 and 18 are, of course, sufficiently rigid to properly support the box and due to their peculiar connection with the box, no more space is necessary for the accommodation of the box than was required heretofore. Due to the unequal length of the bars 17 and 18, the box may be mounted between adjacent joists or struts in any desirable location, since it does not matter if one of the bars extends beyond a joist or strut because the bars will both be disposed between adjacent laths.

From the foregoing, it will be apparent that I have provided a combination structure including an outlet box and hanging means therefor embodied as a single unit which occupies no more space than necessitated heretofore and which permits the box to be mounted in any desirable location. Moreover, the box and hanger unit is simple in construction, easy to assemble, durable, and may be economically manufactured. In addition, it will be apparent that I have provided a new and expeditious method of making an outlet box.

I am aware that numerous details of construction may be varied through a wide range without departing from the principles of this invention, and I, therefore, do not purpose limiting the patent granted, otherwise than necessitated by the prior art.

I claim as my invention:

1. In combination, an outlet box, a hanger strip for said box, and an angular portion on said strip extending into said box and secured to the bottom thereof.

2. In combination, an outlet box, and a pair of separate oppositely disposed hanger strips each extending within and secured to the bottom of said box.

3. In combination, an outlet box having an aperture in each of a pair of opposed sides, and a hanger bar for each of said sides including an inwardly turned portion, and a tongue struck from said portion for extending through said aperture and engaging the opposite face of the respective side.

4. In combination, an outlet box having an aperture in each of a pair of opposed sides thereof, a hanger bar extending laterally from each of said sides, an inwardly turned portion on each bar, the ends of said portions being riveted to the bottom of said box, and tongues struck from said portions and extending through said apertures for engaging the opposite face of the respective box side.

5. In combination, an outlet box having a notch in the top margin of each of a pair of opposed sides thereof, a hanger bar resting within each of said notches, and a depending portion on each of said bars secured to the bottom of said box.

6. In combination, an outlet box having an aperture in the bottom thereof, a hanger bar extending from said box and having a portion extending through said aperture, said portion being upset to rivet said bar to said box.

In testimony whereof I have hereunto subscribed my name at Chicago, Cook County, Illinois.

CHRISTOPHER C. BUCKELS.